United States Patent [19]

Leon

[11] Patent Number: 4,995,257
[45] Date of Patent: Feb. 26, 1991

[54] MONITOR FOR SHAFT VIBRATION IN AN OPERATING TURBINE

[75] Inventor: Robert L. Leon, Roslyn, Pa.

[73] Assignee: Electric Power Research Institute, Inc., Palo Alto, Calif.

[21] Appl. No.: 327,523

[22] Filed: Mar. 23, 1989

[51] Int. Cl.⁵ .......................................... G01M 15/00
[52] U.S. Cl. ........................................ 73/116; 73/660
[58] Field of Search .............. 73/117.3, 862.34, 117.3, 73/660, 116; 322/99; 290/52; 364/494

[56] References Cited

U.S. PATENT DOCUMENTS 4,347,748  9/1982  Pierson ........................... 73/862.34

Primary Examiner—Jerry W. Myracle
Attorney, Agent, or Firm—Leonard Bloom

[57] ABSTRACT

A monitor for torsional shaft vibration in an operating turbine is described incorporating two marks longitudinally spaced apart on the shaft, sensors longitudinally spaced apart by a predetermined distance for detecting each mark as it passes by the sensor, a timer for measuring the lapse time of rotation of each mark, and a subtractor. The invention overcomes the problem of accurately detecting, measuring and interpreting transient angular shaft vibration.

19 Claims, 1 Drawing Sheet

MONITOR FOR SHAFT VIBRATION IN AN OPERATING TURBINE

BACKGROUND OF THE INVENTION

1. Field of the Invention

This invention relates to monitoring the vibration of a turbine shaft in an operating turbine and more particularly to detecting and measuring angular shaft vibration, torque and power.

2. Description of the Prior Art

Shaft torque can be measured by using strain gages affixed to the shaft and obtaining their output by means of slip rings or telemetry. Non-contacting measurement of shaft torque and shaft vibration can be made by using fixed probes and detecting a keyway or reflective tape segment passing the fixed probes. For torque, two such probes separated by a known shaft length and shaft cross section are required. But when linear shaft position changes occur, or when linear vibration occurs, significant errors can result in both the angular vibration measurement and the torque measurement. This is because early arrival of the keyway or tape segment at the fixed probe could be caused by linear or angular motions.

Summary of the Invention

In accordance with the present invention, a method and apparatus is provided for detecting torsional events on a rotating shaft subjected to torsional loads comprising two marks placed on the rotating shaft longitudinally spaced apart by a two probes longitudinally spaced apart by a predetermined distance for sensing respectively the two marks as each mark passes the respective probe as the shaft rotates, a timer for measuring the lapsed time for each mark to make one revolution on the shaft as the shaft rotates, a subtractor for subtracting the lapsed time of one revolution of one mark from the lapsed time of one revolution of the other mark whereby a difference in lapsed time of rotation of the two marks is indicative of a torsional event.

The invention further provides a method and apparatus for detecting the change in shaft torque on a rotating shaft subjected to a torsional load comprising two marks positioned on the shaft, the marks longitudinally spaced apart by a predetermined distance, two probes for sensing respectively the two marks as each mark passes its respective probe as the shaft rotates, a timer for measuring the lapsed time between the marks passing respective reference positions, the reference positions stationary with respect to the shaft whereby the change in lapsed time from a first torsional load to a second torsional load is indicative of the amplitude of the change in torsional load.

DESCRIPTION OF THE PREFERRED EMBODIMENTS

Figure 1:
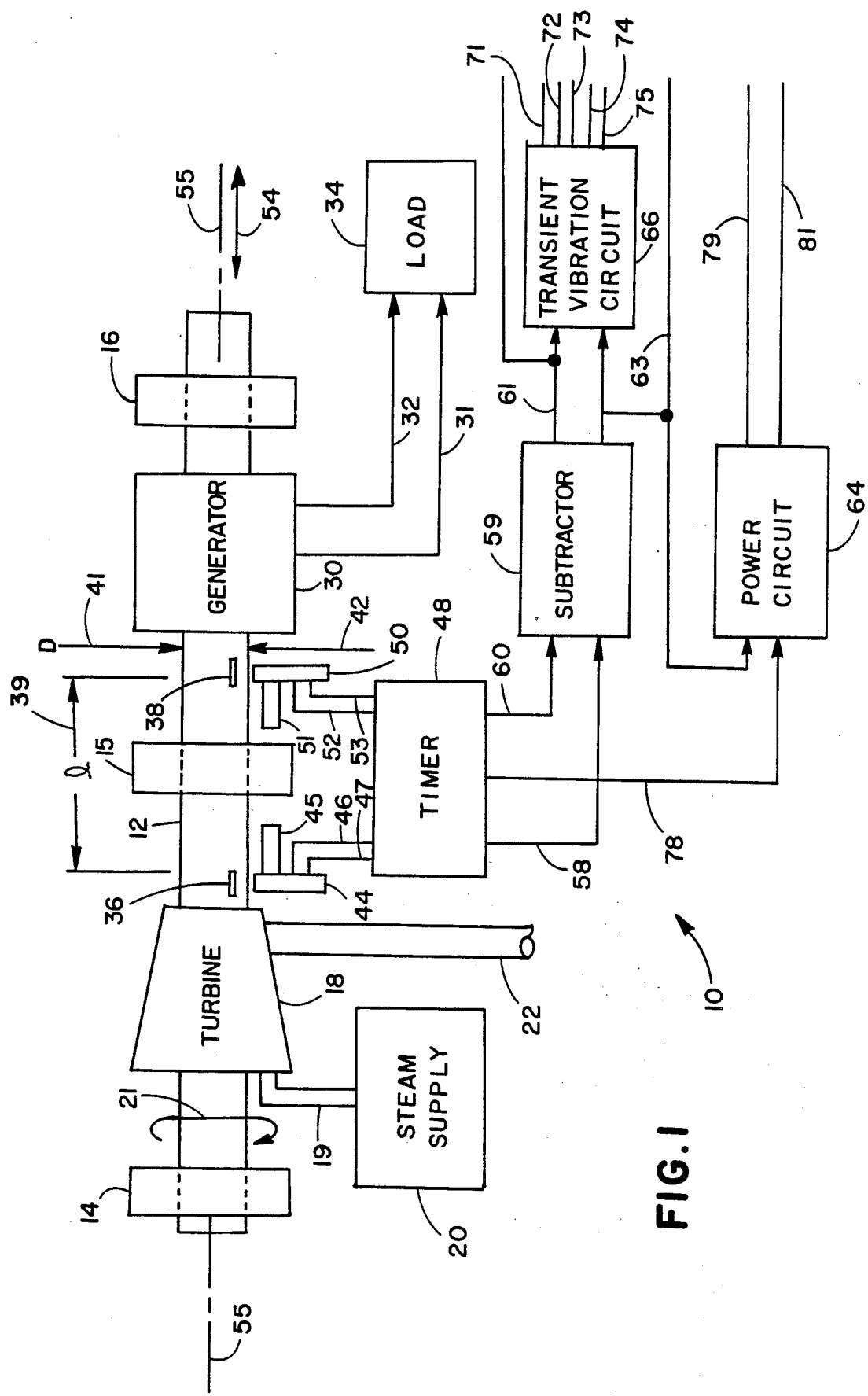
FIG. 1 is a block diagram of one embodiment of the invention.

Referring to FIG. 1, a monitor 10 is shown for detecting torsional events on rotating shaft 12. Rotating shaft 12 is supported by bearings 14, 15 and 16. Bearings 14, 15 and 16 function to hold rotating shaft 12 in place. Shaft 12 also provides the shaft of turbine 18 which may be, for example, a steam turbine having steam supplied over duct 19 from steam supply 20. Turbine 18 may, for example, cause shaft 12 to rotate as shown by arrow 21. Steam may be exhausted from turbine 18 over duct 22.

Turbine 18 may be, for example, coupling mechanical power by way of shaft 12 to alternator or generator 30 which may be, for example, an electrical generator supplying output power over leads 31 and 32 to load 34.

Positioned on shaft 12 may be two marks 36 and 38 which may be longitudinally spaced apart by a predetermined distance 1 as shown by arrow 39. Marks 36 and 38 may be, for example, a keyway, or a reflective tape segment. Shaft 12 may have a circular cross section of diameter D as shown by arrows 41 and 42.

Probe 44 is supported and held stationary with respect to shaft 12 by support member 45. Probe 44 is positioned to sense mark 36 each time it passes in front of probe 44 indicating one revolution of shaft 12. Probe 44 may, for example, provide a beam of light towards shaft 12 to be reflected off mark 36 for example, a reflective tape segment. Probe 44 may have a light sensing device for detecting the reflection of light from mark 36. An output of signal upon detection of mark 36 is coupled over leads 46 and 47 to respective inputs of timer 48. Likewise, probe 50 is supported and positioned stationary with respect to shaft 12 by support member 51. Probe 50 functions to detect mark 38 each time mark 38 passes probe 50 due to one revolution of shaft 12. Probe 50 may provide a light beam which may be reflected off mark 38 and detected by probe 50. An output signal from probe 50 is coupled over leads 52 and 53 to respective inputs of timer 48.

Shaft 12 may have a longitudinal axis 55. Shaft 12 may move along longitudinal axis 55 due to longitudinal forces generated by turbine 18 and generator 30. Probe 44 and probe 50 detect marks 36 and 38 respectively in a manner that is relatively insensitive to longitudinal motion of shaft 12 as shown by arrow 54. Marks 36 and 38 may be, for example, longitudinally aligned reflective tape segments and probes 44 and 50 may use a reflected light beam for detecting marks 36 and 38.

Timer 48 functions to measure the lapsed time of mark 36 to make one revolution on shaft 12 as detected by probe 44. Timer 48 functions to measure the lapsed time of mark 38 to make one revolution on shaft 12 as detected by probe 50. The lapsed time for each mark 36 and 38 respectively to make one revolution on shaft 12 is 16.662 microseconds for shaft 12 rotating at 3601 rpm; 16.666 microseconds for the shaft 12 rotating at 3600 rpm and 16.671 microseconds for shaft 12 turning at 3599 rpm. The lapsed time of mark 36 as detected by probe 44 is coupled over lead 58 to an input of subtractor 59. The lapsed time of mark 38 to make one rotation on shaft 12 as detected by probe 50 is coupled over lead 60 to a second input of subtractor 59. Subtractor 59 functions to subtract the lapse time of rotation of mark 36 from the lapse time of rotation of mark 38 whereby a difference in lapsed time is indicative of a torsional event. The difference in lapse time may be coupled over lead 61 to an input of transient vibration circuit 66. Subtractor 59 may have a second output on lead 63 to provide the current rpm of shaft 12 based on either mark 36 or mark 38 lapsed time information or based on a combination of the two. Lead 63 is also coupled to an input of power circuit 64.

In operation, an output of subtractor 59 on lead 61 is indicative of a torsional event in that shaft 12 must have exhibited some windup or winddown between marks 36 and 38 to cause the lapsed time of one rotation of mark 36 to be different from mark 38. It is noted that with constant torque on shaft 12 that the lapsed time of rotation of shaft 12 as indicative by marks 36 and 38 would be equal. Thus, a difference in lapsed time of rotation of marks 36 and 38 is an indication of twisting, windup or winddown of shaft 12 during the revolution of shaft 12 that the measurement was taken.

Transient vibration circuit 66 functions to provide the nature and source of torque transients on shaft 12. A torque transient on shaft 12 of a given sense could be caused by a torque increase from one end of shaft 12 or a torque decrease form the other end. The nature and source of torque transients on shaft 12 is resolved by the determination of the corresponding speed increase or decrease of shaft 12 as measured at either probe 36 or 38 or more exactly by the average of the measurements of both probes 36 and 38. For example, both a turbine water induction incident and a generator load reduction incident result in a sudden torque decrease, but a water induction incident would be accompanied by a speed decrease and a generator load reduction incident would be accompanied by a speed increase. A water induction incident occurs at turbine 18 when exhaust steam in duct 22 or further down stream condenses as water and flows backwards via duct 22 into turbine 18 filling up the lower portions of turbine 18 causing the rotor and more specifically, the turbine blades to pass through the water slowing down the turbine blades and shaft 12.

Transient vibration circuit 66 receives a difference signal on lead 31 indicative of the lapsed time of one revolution of mark 38 subtracted by the lapsed time of one revolution of mark 36. A positive increase in the difference indicates that the lapsed time of mark 38 to make one revolution was greater than the lapsed time of mark 36 to make a revolution which is indicative of an increase in torque on shaft 12. If the signal on lead 61 is negative, then the lapsed time of mark 36 to make a revolution was greater than the lapsed time of mark 38 to make a revolution indicative of a decrease in torque on shaft 12. A signal indicative of the angular velocity or speed of shaft 12 in rpm is coupled over lead 63 to a second input of transient vibration circuit 66. From the sense of the signals on leads 61 and 63, for example, positive, negative, increasing or decreasing signals, transient vibration circuit 66 is able to indicate four conditions relative to turbine 18 or generator 30 over leads 71-74. Furthermore, based on the value of the signals on leads 61 and 63, transient vibration circuit 66 may make a quantitative estimate or measurement over lead 75 with respect to the condition indicated on one of leads 71-74.

Referring to Table I, the condition of turbine 18 or generator 30 is provided as a function of the signals on leads 61 and 63. If the signal on lead 61 is positive, and the rpm on lead 63 increases, then the torque on shaft 12 is increased and the most likely explanation for the increase in torque is that turbine 18 received an increase in steam supply which is indicated on lead 71. Further, generator 30 probably experienced no change in electrical load.

TABLE I

| DIFFERENCE IN LAPSE TIME OF MARK 38-36 ON LEAD 61 | SHAFT 12 SPEED (RPM) ON LEAD 63 | TORQUE ON SHAFT 12 | TURBINE 18 CONDITION | GENERATOR 30 CONDITION |
| --- | --- | --- | --- | --- |
| 1. positive | increase | increase | increase in steam supply (lead 71) | no change |
| 2. positive | decrease | increase | no change | increased load (lead 72) |
| 3. negative | increase | decrease | no change | decreased load (lead 73) |
| 4. negative | decrease | decrease | decrease in steam supply or water induction incident (lead 74) | no change |

If the signal on lead 63 is positive and the signal on lead 61 shows a decrease in rpm of shaft 12, then the torque on shaft 12 will have increased. The most likely explanation for the increase in torque is that generator 30 experienced an increase in electrical load which is indicated on lead 72. Turbine 18 probably experienced no change in steam supply or other conditions.

If the signal on lead 61 is negative and the signal on lead 63 indicates an increase of rpm of shaft 12 then the torque on shaft 12 has decreased. The most likely explanation is that generator 30 experienced a decrease in electrical load which is indicated on lead 73. Further, turbine 18 probably has experienced no change in conditions.

If the signal on lead 61 is negative and the signal on lead 63 indicates a decrease in rpm of shaft 12, then the torque on shaft 12 has decreased. The most likely explanation is that turbine 18 experienced a decrease in steam supply or experienced a water induction incident which is indicated on lead 74. Generator 30 probably has experienced no change in electrical load.

At times when there is a signal on lead 74, a corresponding signal on lead 75 may indicate quantitatively the decrease in steam supply or quantitatively the amount of water inducted into turbine 18 via duct 22. Similarly, at times when there is a signal on either lead 72 or 73 the signal on lead 75 may indicate quantitatively the increase in electrical load or the decrease in electrical load respectively. Further, at times when there is a signal on lead 71, the signal on lead 75 may indicate quantitatively the increase in steam supply. Alternately, the signal on lead 75 may indicate the value of the increase of decrease of the torque on shaft 12.

Subtractor 59 may further measure the change in shaft torque by measuring the time difference with respect to marks 36 and 38 passing respective probes 44 and 50 as shaft 12 rotates. The time lapse between marks 36 and 38 passing respective reference positions provides an indication of the torque on shaft 12. A change in the lapse time indicates a change in the torque on shaft 12. The amplitude of the change in lapse time is an indication of the amplitude of the change in torsional load or torque on shaft 12. The lapse time between marks 36 and 38 arriving at respective reference positions may be coupled over lead 78 to an input of power circuit 64. The signal on lead 78 may provide an indication of torque on shaft 12. Power circuit 64 functions to multiply the torque given on lead 78 by the rpm provided on lead 63 to provide an indication of power transferred from turbine 36 to generator 30 on lead 79. Power circuit 64 may also generate a signal on lead 81 indicative of the torque on shaft 12 between turbine 18 and generator 30.

The invention provides an apparatus and method for detecting torsional events on a rotating shaft or rotor subjected to torsional loads comprising two marks placed on the shaft longitudinally spaced apart and sensors longitudinally spaced apart by a predetermined distance for sensing the two marks as each passes a respective position as the shaft rotates, a timer for measuring the lapsed time of each mark to make one rotation of the shaft as the shaft rotates, a subtractor for subtracting the lapsed time of rotation of one mark from the lapsed time of rotation of the other mark whereby the difference in lapsed time is indicative of a torsional event.

The invention further provides an apparatus and method for detecting a change in shaft torque on a rotating shaft or rotor subjected to a torsional load comprising two marks positioned on the shaft and a first and second sensor longitudinally spaced apart by a predetermined distance, for sensing the two marks respectively as each mark passes its respective sensor as the shaft rotates, a timer for measuring the lapsed time between the marks passing respective reference positions, the reference positions stationary with respect to the shaft whereby the change in lapsed time from a first torsional load to a second torsional load is indicative of the amplitude of the change in torsional load.

What is claimed is:

1. An apparatus for detecting torsional events on a rotating shaft subjected to torsional loads comprising:
   two marks placed on said shaft longitudinally spaced apart,
   means, longitudinally spaced apart by a predetermined distance, for sensing said two marks as each mark passes a respective position as said shaft rotates,
   means for measuring the lapse time for each mark to make one rotation on said shaft as the shaft rotates,
   means for subtracting the lapse time of rotation of one mark from the lapse time of rotation of the other mark, whereby a difference in lapse time is indicative of torque on the shaft, and
   transient vibration circuit means connected to said subtracting means for determining torsional vibrations on the shaft.

2. The apparatus of claim 1, wherein said means for sensing said two marks in insensitive to linear vibration along the longitudinal axis of said shaft.

3. The apparatus of claim 1, wherein said means for sensing includes a light beam directed at said shaft in the path of at least one of said rotating marks.

4. The apparatus of claim 1, wherein said means for measuring includes a timer.

5. The apparatus of claim 1, further including means for generating a first signal indicative of the rpm of said shaft.

6. An apparatus for detecting torsional events on a rotating shaft subjected to torsional loads comprising:
   two marks placed on said shaft longitudinally spaced apart,
   means, longitudinally spaced apart by a predetermined distance, for sensing said two marks as each mark passes a respective position as said shaft rotates,
   means for measuring the lapse time for each mark to make one rotation on said shaft as the shaft rotates,
   means for subtracting the lapse time of rotation of one mark from the lapse time of rotation of the other mark, whereby a difference in lapse time is indicative of a torsional event,
   further including means for generating a first signal indicative of the rpm of said shaft, and still
   further including a steam turbine and means for generating an output signal indicative of an increased supply of stream to the turbine in response to a positive difference in lapse time from said means for subtracting and an increase in said first signal indicative of an increase in the rpm of said rotating shaft.

7. An apparatus for detecting torsional events on a rotating shaft subjected to torsional loads comprising:
   two marks placed on said shaft longitudinally spaced apart,
   means, longitudinally spaced apart by a predetermined distance, for sensing said two marks as each mark passes a respective position as said shaft rotates,
   means for measuring the lapse time for each mark to make one rotation on said shaft as the shaft rotates,
   means for subtracting the lapse time of rotation of one mark from the lapse time of rotation of the other mark, whereby a difference in lapse time is indicative of a torsional event,
   further including means for generating a first signal indicative of the rpm of said shaft, and still
   further including an electric generator and means for generating an output signal indicative of an increased electrical load to the electric generator in response to a positive difference in lapse time from said means for subtracting and a decrease in said first signal indicative of an decrease in the rpm of said rotating shaft.

8. An apparatus for detecting torsional events on a rotating shaft subjected to torsional loads comprising:
   two marks placed on said shaft longitudinally spaced apart,
   means, longitudinally spaced apart by a predetermined distance, for sensing said two marks as each mark passes a respective position as said shaft rotates,
   means for measuring the lapse time for each mark to make one rotation on said shaft as the shaft rotates,
   means for subtracting the lapse time of rotation of one mark from the lapse time of rotation of the other mark, whereby a difference in lapse time is indicative of a torsional event,
   further including means for generating a first signal indicative of the rpm of said shaft, and still further including an electric generator and means for generating an output signal indicative of a decreased electrical load to the electric generator in response to a negative difference in lapsed time from said means for subtracting and an increase in said first signal indicative of an increase in the rpm of said rotating shaft.

9. An apparatus for detecting torsional events on a rotating shaft subjected to torsional loads comprising:
two marks placed on said shaft longitudinally spaced apart,
means, longitudinally spaced apart by a predetermined distance, for sensing said two marks as each mark passes a respective position as said shaft rotates,
means for measuring the lapse time for each mark to make one rotation on said shaft as the shaft rotates,
means for subtracting the lapse time of rotation of one mark from the lapse time of rotation of the other mark, whereby a difference in lapse time is indicative of a torsional event,
further including means for generating a first signal indicative of the rpm of said shaft, and still
further including a steam turbine and means for generating an output signal indicative of a decrease in steam supply to the turbine in response to a negative difference in lapsed time from said means for subtracting and a decrease in said first signal indicative of a decrease in the rpm of said rotating shaft.

10. An apparatus for detecting torsional events on a rotating shaft subjected to torsional loads comprising:
two marks placed on said shaft longitudinally spaced apart,
means, longitudinally spaced apart by a predetermined distance, for sensing said two marks as each mark passes a respective position as said shaft rotates,
means for measuring the lapse time for each mark to make one rotation on said shaft as the shaft rotates,
means for subtracting the lapse time of rotation of one mark from the lapse time of rotation of the other mark, whereby a difference in lapse time is indicating of a torsional event,
further including means for generating a first signal indicative of the rpm of said shaft, and still
further including a water turbine and means for generating an output signal indicative of a water induction incident in the turbine in response to a negative difference in lapsed time from said means for subtracting and a decrease in said first signal indicative of a decrease in the rpm of said rotating shaft.

11. A method for detecting torsional events on a rotating shaft having two marks placed on said shaft longitudinally spaced apart comprising the steps of:
sensing at two locations longitudinally spaced apart by a predetermined distance the two marks as each mark passes a respective stationary position as said shaft rotates,
measuring the lapse time of each mark to make one rotation on said shaft as the shaft rotates,
subtracting the lapse time of rotation of one mark from the lapse time of rotation of the other mark, whereby a difference in lapsed time is indicative of torque on the shaft, and
determining torsional transient vibrations on the shaft.

12. The method of claim 11, further including the step of generating a first signal indicative of the angular velocity of said shaft.

13. A method for detecting torsional events on a rotating shaft having two marks placed on said shaft longitudinally spaced apart comprising the steps of:
sensing at two locations longitudinally spaced apart by a predetermined distance the two marks as each mark passes a respective stationary position as said shaft rotates,
measuring the lapse time of each mark to make one rotation on said shaft as the shaft rotates,
subtracting the lapse time of rotation of one mark from the lapse time of rotation of the other mark, whereby a difference in lapsed time is indicative of a torsional event,
including the step of generating a first signal indicative of the angular velocity of said shaft, and still
further including the steps of providing a steam turbine and generating an output signal indicative of an increased supply of steam to the turbine in response to a positive difference in lapse time from said step of subtracting and an increase in said first signal indicative of an increase in the angular velocity of said rotating shaft.

14. A method for detecting torsional events on a rotating shaft having two marks placed on said shaft longitudinally spaced apart comprising the steps of:
sensing at two locations longitudinally spaced apart by a predetermined distance the two marks as each mark passes a respective stationary position as said shaft rotates,
measuring the lapse time of each mark to make one rotation on said shaft as the shaft rotates,
subtracting the lapse time of rotation of one mark from the lapse time of rotation of the other mark, whereby a difference in lapsed time is indicative of a torsional event,
including the step of generating a first signal indicative of the angular velocity of said shaft, and still
further including the steps of providing an electric generator and generating an output signal indicative of decreased electrical load to the electric generator in response to a negative difference in lapsed time from said step of subtracting and an increase in said first signal indicative of an increase in the angular velocity of said rotating shaft.

15. A method for detecting torsional events on a rotating shaft having two marks placed on said shaft longitudinally spaced apart comprising the steps of:
sensing at two locations longitudinally spaced apart by a predetermined distance the two marks as each mark passes a respective stationary position as said shaft rotates,
measuring the lapse time of each mark to make one rotation on said shaft as the shaft rotates,
subtracting the lapse time of rotation of one mark from the lapse time of rotation of the other mark, whereby a difference in lapsed time is indicative of a torsional event,
including the step of generating a first signal indicative of the angular velocity of said shaft, and still
further including the steps of providing a steam turbine and generating an output signal indicative of a decreased in steam supply to the turbine in response to a negative difference in lapsed time from said step of subtracting and a decrease in said first signal indicative of a decrease in the angular velocity of said rotating shaft.

16. A method for detecting torsional events on a rotating shaft having two marks placed on said shaft longitudinally spaced apart comprising the steps of:
sensing at two locations longitudinally spaced apart by a predetermined distance the two marks as each mark passes a respective stationary position as said shaft rotates,
measuring the lapse time of each mark to make one rotation on said shaft as the shaft rotates,
subtracting the lapse time of rotation of one mark from the lapse time of rotation of the other mark, whereby a difference in lapsed time is indicative of a torsional event,
including the step of generating a first signal indicative of the angular velocity of said shaft, and still further including the steps of providing a water turbine and generating an output signal indicative of a water induction incident in the turbine in response to a negative difference in lapsed time from said step of subtracting and a decrease in said first signal indicative of a decrease in the angular velocity of said rotating shaft.

17. An apparatus for detecting the change in shaft torque on a rotating shaft subjected to a torsional load as well as detecting transient torsional vibrations on the shaft, comprising,
two marks positioned on said shaft longitudinally spaced apart,
means, longitudinally spaced apart by a predetermined distance, for sensing said two marks as each mark passes a respective stationary reference position as said shaft rotates,
subtracting means for measuring the lapse time between said marks passing said respective reference positions,
said reference position stationary with respect to said shaft, whereby the change in lapse time from a first torsional load to a second torsional load is indicative of the amplitude of said change in torque on the shaft, and
transient vibration circuit means connected to said subtracting means for determining transient torsional vibrations on the shaft.

18. A method for detecting the change in torque on a rotating shaft subjected to a torsional load, as well as detecting transient torsional vibrations on the shaft, wherein said shaft has two marks positioned thereon spaced longitudinally apart, comprising the steps of:
sensing at two locations longitudinally spaced apart by a predetermined distance two marks as each mark passes a respective reference position as said shaft rotates, said reference positions stationary with respect to said shaft,
measuring the lapse time between said marks passing respective reference positions, whereby the changes in lapse time from a first torsional load to a second torsional load is indicative of the amplitude of said change in torque on the shaft, and
determining transient torsional vibrations on the shaft.

19. The method of claim 18, further including determining the rpm of said shaft, and multiplying the rpm of said shaft by an estimate of the torque on said shaft to provide a signal indicative of power being transferred by said shaft.

* * * * *